(12) United States Patent
Birecki et al.

(10) Patent No.: US 10,565,942 B2
(45) Date of Patent: Feb. 18, 2020

(54) DISPLAY DEVICE

(71) Applicant: Hewlett-Packard Development Company, L.P., Houston, TX (US)

(72) Inventors: Henryk Birecki, Palo Alto, CA (US); Omer Gila, Palo Alto, CA (US); Napoleon J Leoni, Palo Alto, CA (US); Steven J Simske, Ft. Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 46 days.

(21) Appl. No.: 15/500,010

(22) PCT Filed: Jul. 29, 2014

(86) PCT No.: PCT/US2014/048629
§ 371 (c)(1),
(2) Date: Jan. 27, 2017

(87) PCT Pub. No.: WO2016/018256
PCT Pub. Date: Feb. 4, 2016

(65) Prior Publication Data
US 2017/0263191 A1   Sep. 14, 2017

(51) Int. Cl.
*G09G 3/34* (2006.01)
*G06F 1/16* (2006.01)

(52) U.S. Cl.
CPC .......... *G09G 3/344* (2013.01); *G06F 1/1652* (2013.01); *G09G 2300/0426* (2013.01); *G09G 2310/0251* (2013.01)

(58) Field of Classification Search
CPC .......... G09G 3/344; G09G 2310/0251; G09G 2300/0426; B41J 3/4076; G02F 1/167; G02F 1/1672; G02F 1/172
See application file for complete search history.

(56) References Cited

U.S. PATENT DOCUMENTS

| | | | |
|---|---|---|---|
| 5,866,284 A | 2/1999 | Vincent | |
| 6,333,754 B1 | 12/2001 | Oba et al. | |
| 6,515,790 B2 | 2/2003 | Miyamoto et al. | |
| 6,982,734 B2 | 1/2006 | Pan | |
| 7,140,550 B2 | 11/2006 | Ramachandran | |
| 7,479,942 B2 | 1/2009 | Sprague et al. | |
| 7,580,845 B2 | 8/2009 | Burman et al. | |
| 7,855,711 B2 | 12/2010 | Schmitz | |
| 7,920,112 B2 | 4/2011 | Kurihara et al. | |

(Continued)

FOREIGN PATENT DOCUMENTS

| | | |
|---|---|---|
| JP | 2004251972 A | 9/2004 |
| JP | 2009020279 A | 1/2009 |

*Primary Examiner* — Sardis F Azongha
(74) *Attorney, Agent, or Firm* — Dicke Billig & Czaja PLLC

(57) ABSTRACT

One example provides a display device. The display device includes an electronic paper display imageable by receiving charges on an imaging surface of the electronic paper display. The display device includes a first ground electrode opposite to a first portion of the imaging surface of the electronic paper display and a second ground electrode opposite to a second portion of the imaging surface of the electronic paper display. Writing to the second portion of the electronic paper display is selectively disableable.

20 Claims, 5 Drawing Sheets

(56) References Cited

U.S. PATENT DOCUMENTS

| | | | |
|---|---|---|---|
| 8,063,878 B2* | 11/2011 | Jung | G06F 3/147 |
| | | | 345/107 |
| 8,144,388 B2 | 3/2012 | Ogawa | |
| 8,493,319 B2* | 7/2013 | Gila | G02F 1/167 |
| | | | 345/107 |
| 8,514,256 B2 | 8/2013 | Ogawa et al. | |
| 2003/0067427 A1 | 4/2003 | Comiskey et al. | |
| 2005/0134550 A1 | 6/2005 | Schmitz | |
| 2006/0017659 A1* | 1/2006 | Ogawa | B41J 3/4076 |
| | | | 345/30 |
| 2006/0158335 A1 | 7/2006 | Jung et al. | |
| 2007/0045399 A1 | 3/2007 | Martin | |
| 2008/0224990 A1 | 9/2008 | Shimodaira | |
| 2010/0066717 A1 | 3/2010 | Kodama | |
| 2011/0298760 A1 | 12/2011 | Gila et al. | |
| 2012/0206341 A1* | 8/2012 | Gila | B41J 3/4076 |
| | | | 345/156 |
| 2012/0274620 A1 | 11/2012 | Hwang et al. | |
| 2012/0320001 A1 | 12/2012 | Gila et al. | |
| 2013/0003162 A1 | 1/2013 | Leoni et al. | |
| 2013/0235446 A1 | 9/2013 | Leoni et al. | |
| 2014/0210805 A1 | 7/2014 | Birecki et al. | |
| 2014/0239068 A1 | 8/2014 | Park | |
| 2014/0253426 A1 | 9/2014 | Leoni et al. | |

\* cited by examiner

DISPLAY DEVICE

BACKGROUND

Electronic paper ("e-paper") is a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

DETAILED DESCRIPTION

Figure 1:
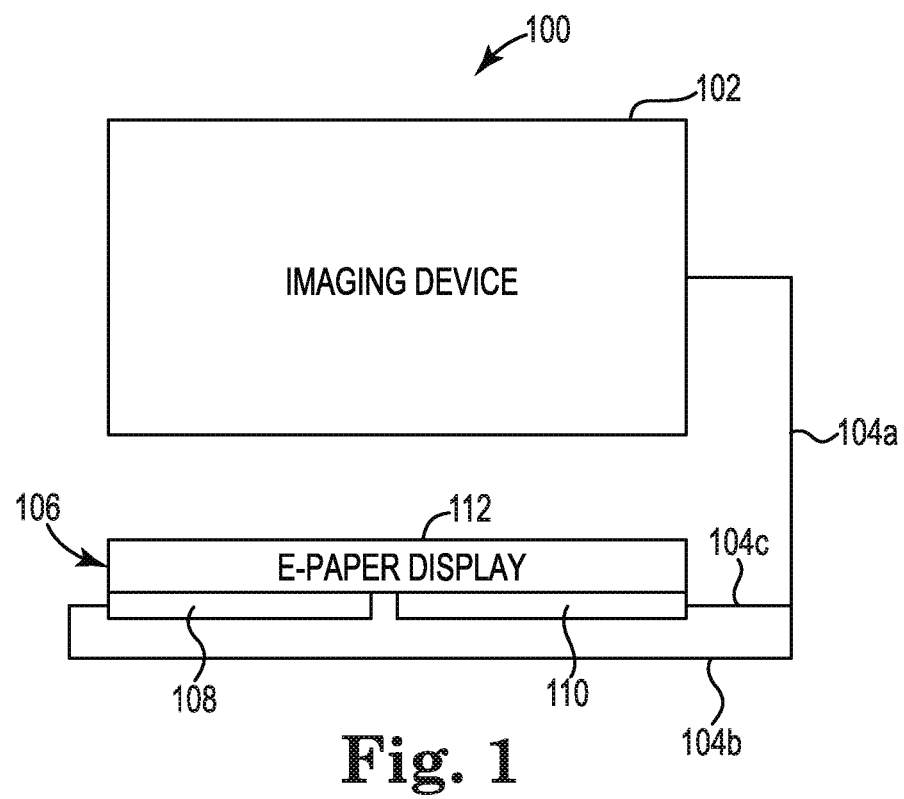
FIG. 1 illustrates one example of an imaging system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Electronic paper ("e-paper") is used in a variety of display applications such as signage, e-books, tablets, cards, posters, and pricing labels. E-paper has several paper-like features. For example, e-paper is a reflective display that uses ambient light as an illumination source. The ambient light strikes the surface and is reflected to the viewer. The usage of pigments similar to those that are used in printing allows the e-paper to be read at a wide range of angles and lighting conditions, including full sunlight. The use of ambient light also eliminates the need for illumination produced by the device, such as a backlight. This minimizes the power used by the e-paper. In addition, the e-paper does not use power to maintain the image (i.e., maintaining state is passive). Once the image is written, the image remains on the e-paper for an extended period of time or until the e-paper is rewritten. Thus, a typical e-paper primarily uses power for changing the optical state of the e-paper (i.e., change of state is active).

E-paper is typically written by generating a charge on a surface in proximity to a layer of microcapsules that contain charged pigment particles. The charge on the surface attracts or repels the non-fixed charged pigment particles in the microcapsules to create the desired image. No physical supplies (e.g., ink) are used for writing to e-paper and the power used to write to e-paper is low.

The following disclosure describes examples of a display device, such as a gift card, prepaid card, debit card, credit card, access card, or other suitable device that includes a passive e-paper display. The e-paper display is imageable by receiving charges on an imaging surface of the e-paper display from an imaging device. The e-paper display includes a first portion in which the displayed content can be rewritten and a second portion in which the displayed content can be made permanent. Once the displayed content of the second portion is made permanent, the second portion cannot be rewritten. In one example, the content displayed in the second portion can be made permanent by electrically disabling the ground return path for the second portion. The ground return path may be disabled electrically by using a fusible link, a smart chip in combination with an electrical switch (e.g., transistor), or by shorting the ground return path to the imaging surface. Alternatively, the ground return path may be disabled mechanically by physically breaking the ground return path for the second portion. In another example, the content displayed in the second portion can be made permanent by changing the electrochemical properties of the second portion. In another example, a secure smart chip in combination with an electrical switch may be used to dynamically control writeability of the second portion to enable system based secure applications.

FIG. 1 illustrates one example of an imaging system 100. Imaging system 100 includes an imaging device 102 and an e-paper display device 106. In one example, e-paper display device 106 is a gift card, prepaid card, debit card, credit card, access card, or other suitable device. E-paper display device 106 includes a first ground electrode 108 and a second ground electrode 110 opposite to an imaging surface 112. First ground electrode 108 provides a first counter-electrode for a first portion of e-paper display device 106. Second ground electrode 110 provides a second counter-electrode for a second portion of e-paper display device 106. E-paper display device 106 also includes an active layer that switches color when an electric field or electrical charges is/are applied to imaging surface 112 of e-paper display device 106. In one example, the active layer contains a switchable pigment or dye combination. A resin or polymer may be used to encapsulate the active layer. One example of e-paper display device 106 is further described below with reference to FIG. 7.

Imaging device 102 erases and/or writes to e-paper display device 106. Prior to and during erasing or writing to e-paper display device 106, imaging device 102 is electrically coupled to e-paper display device 106 through a ground connection 104a. Ground connection 104a is electrically coupled to first ground electrode 108 through a ground connection 104b and to second ground electrode 110 through a ground connection 104c. Once e-paper display device 106 has been erased and/or written, ground connection 104a may be removed.

First ground electrode 108 and ground connection 104b and second ground electrode 110 and ground connection 104c allow counter charges to flow to first ground electrode 108 and second ground electrode 110, respectively, from imaging device 102. Thus, e-paper display device 106 remains basically charge neutral despite charges being ejected onto imaging surface 112. Without a connection between first ground electrode 108 and/or second ground electrode 110 and imaging device 102, no appreciable amount of charges can be ejected onto imaging surface 112 and thus no information can be written to e-paper display device 106.

After writing to e-paper display device 106, ground connection 104c may be severed such that second ground electrode 110 cannot be electrically recoupled to ground connection 104a. Therefore, the content displayed in the portion of e-paper display device 106 opposite to second ground electrode 110 becomes permanent. In one example, ground connection 104b is not severed such that first ground electrode 108 can be electrically recoupled to ground connection 104a. Therefore, the portion of e-paper display device 106 opposite to first electrode 108 may be rewritten.

Figure 2:
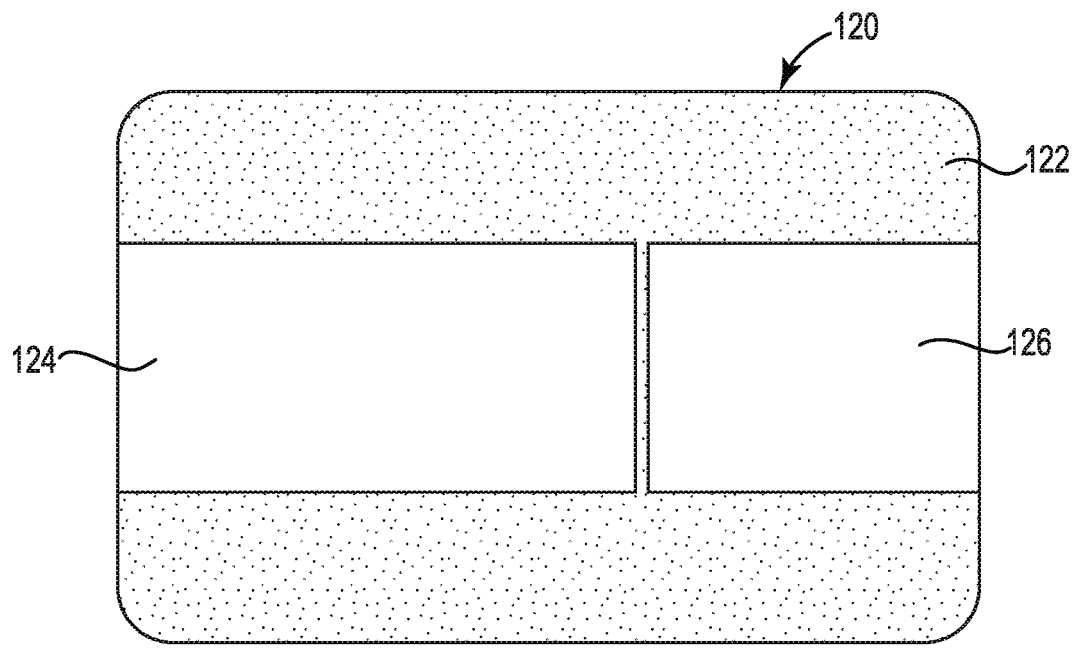
FIG. 2 illustrates one example of a display device.

FIG. 2 illustrates one example of a display device 120. Display device 120 may be used in imaging system 100 previously described and illustrated with reference to FIG. 1. Display device 120 includes a support structure 122 and an e-paper display including a first portion 124 and a second portion 126. The e-paper display is mounted in support structure 122. Support structure 122 can be composed of a transparent material or an opaque material. Support structure 122 can be composed of polyester, plastic, glass, transparent Mylar, or other suitable material. In one example, support structure 122 includes a bottom layer and a top layer with the e-paper display arranged between the bottom layer and the top layer. In this example, support structure 122 is shaped to provide a display device 120 in the form of a card, such as a gift card, prepaid card, debit card, credit card, or access card.

First portion 124 of the e-paper display is rewritable. Rewriting to second portion 126 of the e-paper display can be selectively disabled. First portion 124 includes a first ground electrode (e.g., ground electrode 108 previously described and illustrated with reference to FIG. 1) and second portion 126 includes a second ground electrode (e.g., ground electrode 110 previously described and illustrated with reference to FIG. 1). In one example, an electrical link within display device 120 to the second ground electrode can be selectively severed to prevent rewriting of second portion 126.

In one example, first portion 124 may be used to display content that can be updated while second portion 126 may be used to display content that cannot be updated. For example, for a payment card application, first portion 124 may display an updateable card balance while second portion 126 may display a security code that is written once upon activation of the payment card and then made permanent. In another example, second portion 126 may remain updateable until a specified event occurs, such as the expiration of the display device or an unauthorized use of the display device (which may be controlled by an authorization process using a smart chip). In this example, a message may be written to second portion 126 indicating the event and/or instructions to the user. In other examples, first portion 124 and second portion 126 can be used for other suitable applications.

While display device 120 includes first portion 124 and second portion 126, in other examples the display device may include any suitable number of portions each having a corresponding ground electrode. In this case, the display device may be designed to enable selective disabling of one or more portions of the e-paper display using the techniques described herein.

Figure 3:
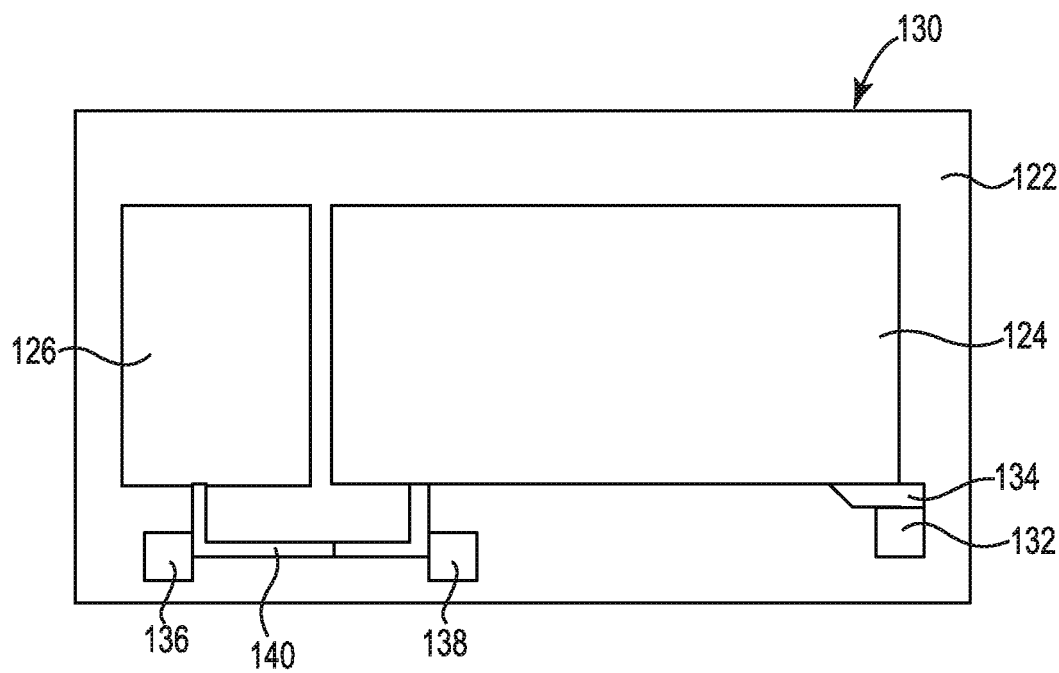
FIG. 3 illustrates another example of a display device.

FIG. 3 illustrates another example of a display device 130. Display device 130 may be used in imaging system 100 previously described and illustrated with reference to FIG. 1. Display device 130 includes a support structure 122 and an e-paper display including a first portion 124 and a second portion 126. The e-paper display is mounted in support structure 122. Display device 130 also includes a ground connection contact 132, a fusible link 140, and contacts 136 and 138. In one example, ground connection contact 132 and contacts 136 and 138 are exposed on a surface of support structure 122 and fusible link 140 is encased within support structure 122.

Ground connection contact 132 is electrically coupled to the ground electrode of first portion 124 of the e-paper display through ground connection 134. Ground connection contact 132 is used to electrically couple an imaging device (e.g., imaging device 102 previously described and illustrated with reference to FIG. 1) to the ground electrodes of display device 130 during erasing and/or writing to display device 130. Fusible link 140 electrically couples the ground electrode of first portion 124 of the e-paper display to the ground electrode of the second portion 126 of the e-paper display. Contact 136 is electrically coupled to one side of fusible link 140, and contact 138 is electrically coupled to the other side of fusible link 140.

Fusible link 140 provides a selectively severable electrical link between the ground electrode of first portion 124 of the e-paper display and the ground electrode of the second portion 126 of the e-paper display. With fusible link 140 intact, the ground electrode of first portion 124 of the e-paper display is electrically coupled to the ground electrode of the second portion 126 of the e-paper display such that writing to second portion 126 is enabled. Once fusible link 140 is severed, the ground electrode of first portion 124 of the e-paper display is electrically isolated from the ground electrode of the second portion 126 of the e-paper display such that writing to second portion 126 is disabled. With writing to second portion 126 disabled, the content displayed in second portion 126 is permanent.

In one example, fusible link 140 is a fuse that can be broken by applying a sufficiently large current between contacts 136 and 138. In another example, fusible link 140 includes a conductive material which upon exposure to radiation turns non-conductive. The conductive material may be an ionic polymer electrolyte which upon exposure to ultraviolet (UV) radiation or other shorter wavelength radiation binds the charge transfer agents. In this example, contacts 136 and 138 may be excluded. In other examples, other electrochemical means may be used to disable writing to second portion 126. In another example, fusible link 140 is based on electrolyte exhaustion. Upon passing sufficient charge between contacts 136 and 138, the charge transfer agent is depleted on at least one of the contacts 136 and 138 rendering the fusible link broken. In other examples, fusible link 140 can be physically broken mechanically, such as by punching a hole through the fusible link, breaking an internal bubble within the fusible link, cutting the fusible link, or by another suitable mechanical process. In yet another example, fusible link 140 can be broken by induced current heating, such as due to microwave radiation or other electromagnetic transducer.

Figure 4:
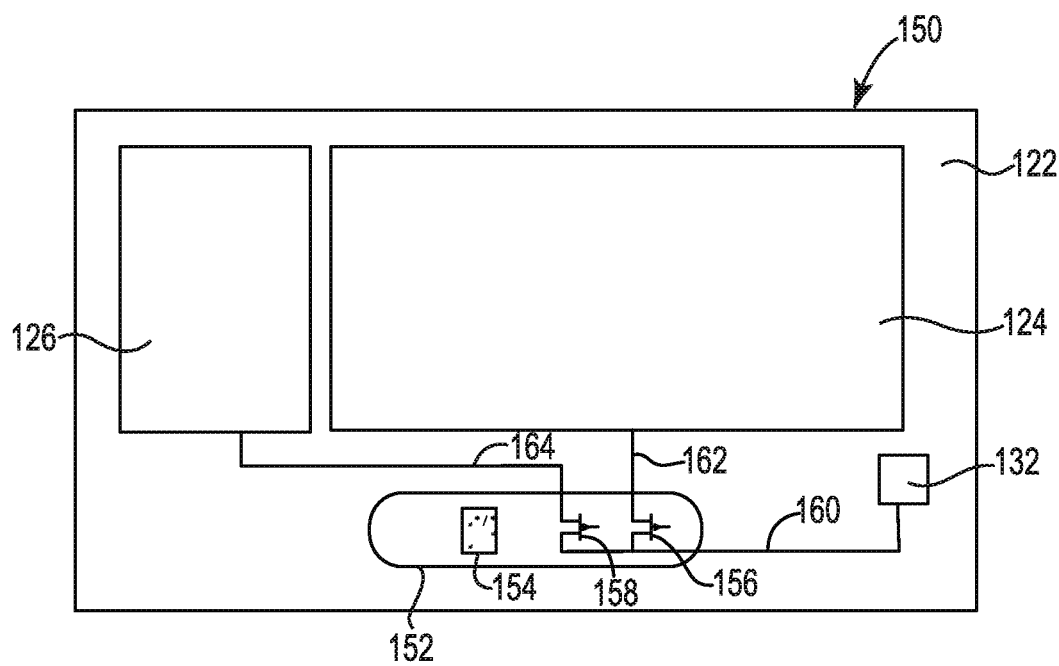
FIG. 4 illustrates another example of a display device.

FIG. 4 illustrates another example of a display device 150. Display device 150 may be used in imaging system 100 previously described and illustrated with reference to FIG. 1. Display device 150 includes a support structure 122 and an e-paper display including a first portion 124 and a second portion 126. The e-paper display is mounted in support structure 122. Display device 150 also includes a ground connection contact 132 and a circuit 152. Circuit 152 includes a smart chip 154, a first switch 156 (e.g., Field Effect Transistor (FET)), and a second switch 158 (e.g., FET).

Ground connection contact 132 is electrically coupled to one side of first switch 156 and one side of second switch 158 through a ground connection 160. Ground connection contact 132 is used to electrically couple an imaging device to the ground electrodes of display device 150 during erasing and/or writing to display device 150. The other side of first switch 156 is electrically coupled to the ground electrode of first portion 124 of the e-paper display through a ground connection 162. The other side of second switch 158 is electrically coupled to the ground electrode of second portion 126 of the e-paper display through a ground connection 164.

First switch 156 and second switch 158 are controlled by smart chip 154 to enable or disable writing to first portion 124 and/or second portion 126 of the e-paper display. Smart chip 154 derives power and communicates with an imaging device by direct contact, Near Field Communication (NFC), inductive coupling, or another suitable method. Data exchanges between the imaging device and the smart chip 154 determine which portions of the e-paper display (if any) are enabled for writing. In one example, the determination as to which portions of the e-paper display are enabled for writing is based on the outcome of an authentication protocol. If first portion 124 of the e-paper display is enabled, switch 156 is closed to electrically couple ground connection contact 132 to the ground electrode of first portion 124. If first portion 124 of the e-paper display is disabled, switch 156 is opened to electrically isolate ground connection contact 132 from the ground electrode of first portion 124. Likewise, if second portion 126 of the e-paper display is enabled, switch 158 is closed to electrically couple ground connection contact 132 to the ground electrode of second portion 126. If second portion 126 of the e-paper display is disabled, switch 158 is opened to electrically isolate ground connection contact 132 from the ground electrode of second portion 126.

Figure 5:
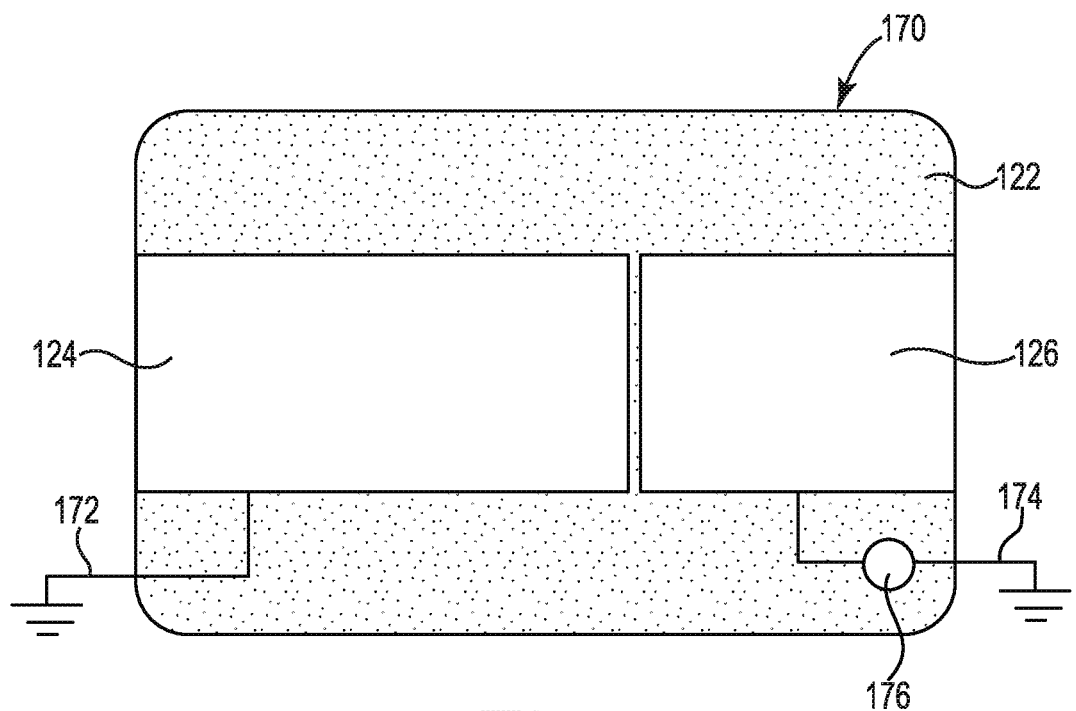
FIG. 5 illustrates another example of a display device.

FIG. 5 illustrates another example of a display device 170. Display device 170 may be used in imaging system 100 previously described and illustrated with reference to FIG. 1. Display device 170 includes a support structure 122 and an e-paper display including a first portion 124 and a second portion 126. The e-paper display is mounted in support structure 122. Display device 170 also includes a first ground connection 172 and a second ground connection 174. In one example, each ground connection 172 and 174 includes a ground connection contact. In another example, ground connections 172 and 174 are electrically coupled to one ground connection contact.

First ground connection 172 is not broken, thus first portion 124 of the e-paper display is rewritable. Second ground connection 174 has been broken as indicated at 176, thus second portion 126 of the e-paper display is not rewritable. Therefore, any content displayed on the second portion 126 of the e-paper display is permanent. Ground connection 174 is broken by a mechanical process in this example, such as by punching a hole through ground connection 174. The mechanical process may be performed by an imaging device after writing to second portion 126 of the e-paper display or by another suitable device.

Figure 6:
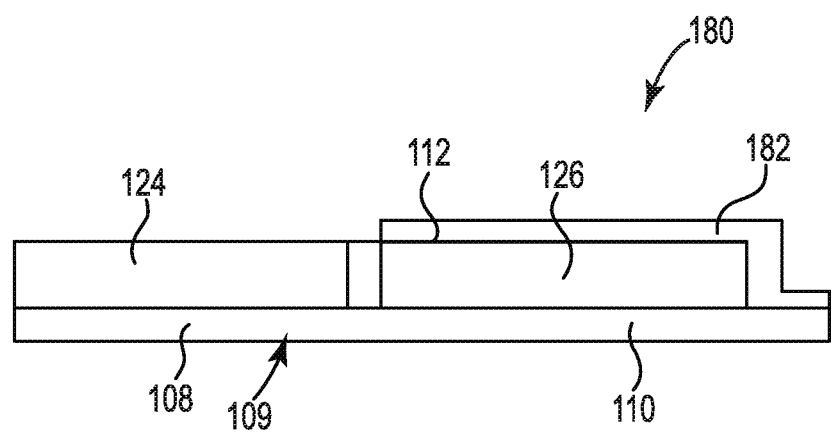
FIG. 6 illustrates a cross-sectional view of another example of a display device.

FIG. 6 illustrates a cross-sectional view of another example of a display device 180. Display device 180 may be used in imaging system 100 previously described and illustrated with reference to FIG. 1. Display device 180 includes an e-paper display including a first portion 124 and a second portion 126. Display device 180 also includes a common ground electrode 109 opposite to first portion 124 and second portion 126, and a layer of pre-conductive ink 182 over the imaging surface 112 of the second portion 126. Common ground electrode 109 provides a first ground electrode 108 opposite to first portion 124 and a second ground electrode 110 opposite to second portion 126.

As used herein and in the claims, a "pre-conductive ink" is an ink that is applied and whose conductivity subsequently increases, for example, by curing with heat, UV light, or other means. For example, the ink is applied in an electrically non-conductive state and then cured to an electrically conductive state.

Writing to second portion 126 is enabled as long as the layer of pre-conductive ink 182 remains uncured. Once the layer of pre-conductive ink 182 is cured, writing to second portion 126 is disabled. The layer of pre-conductive ink 182 becomes electrically conductive when cured, thereby electrically shorting to second ground electrode 110 and electrically encapsulating the imaging surface 112 of second portion 126. With the imaging surface 112 of second portion 126 electrically encapsulated, writing to second portion 126 is disabled. Thus, the content displayed by second portion 126 is made permanent once the layer of pre-conductive ink 182 is cured.

Figure 7:
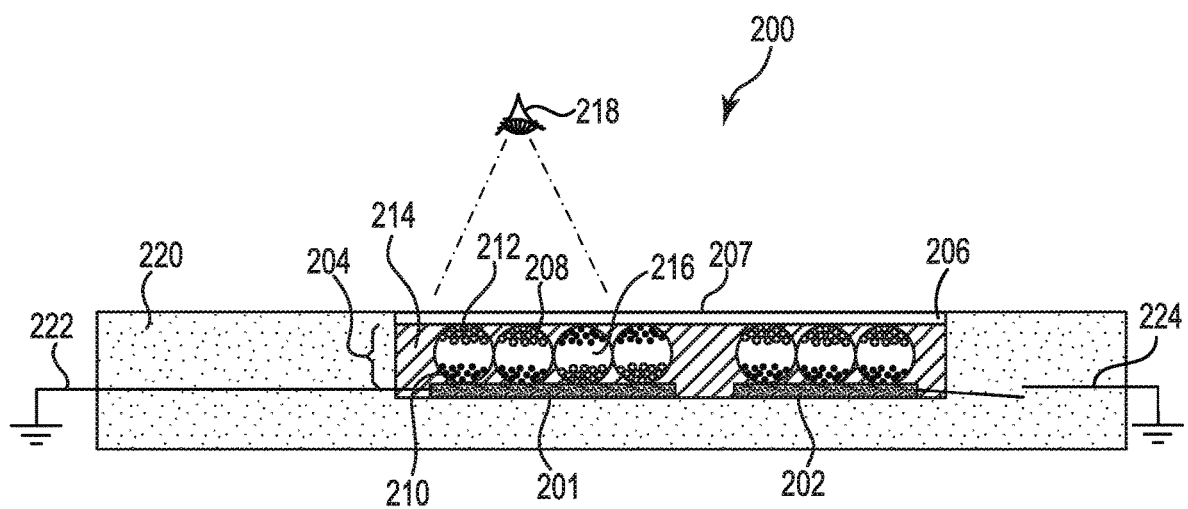
FIG. 7 illustrates a cross-sectional view of one example of an electronic paper ("e-paper") display device.

FIG. 7 illustrates a cross-sectional view of one example of an e-paper display device 200. E-paper display device 200 includes a first ground electrode 201, a second ground electrode 202, an active layer 204, a transparent charge receiving layer 206, a support structure 220, a first ground connection 222, and a second ground connection 224. Active layer 204 includes microcapsules 208 encapsulated by a resin or polymer 214. In one example, each microcapsule 208 includes black particles 210 and white particles 212 suspended in a fluid medium 216. Surface 207 of charge receiving layer 206 provides the imaging surface for e-paper display device 200 and is also the viewing side for a viewer 218 in this example.

Ambient light is transmitted through charge receiving layer 206, strikes microcapsules 208, and is reflected back to the viewer 218. When white particles 212 of a microcapsule 208 are located near charge receiving layer 206, the microcapsule appears white to a viewer 218. When black particles 210 of a microcapsule 208 are located near charge receiving layer 206, the microcapsule appears black to the viewer 218. The particles 210 and 212 have opposite charges. For example, black particles 210 can be positively charged particles, and white particles 212 can be negatively charged particles. Various shades of gray can be created by varying the arrangement of alternating microcapsules with white and black particles located near charge receiving layer 206 to produce halftoning. Microcapsules 208 exhibit image stability using chemical adhesion between particles and/or between the particles and the microcapsule surface. For example, microcapsules 208 can hold text and images indefinitely without using electricity, while allowing the text or images to be changed later.

The structure, materials, and dimensions of the various layers and components of e-paper display device 200 can be adapted to specific design criteria. In one example, the transparent charge receiving layer 206 can be composed of a transparent polymer and can have a thickness between 50 μm and 250 μm. The transparent charge receiving layer 206 can also be composed of a material that holds charges or is porous or semi-porous to charges and/or ions.

The diameter of each microcapsule 208 is substantially constant within e-paper display 200 and can be in one example between 20 μm and 100 μm, such as 50 μm. First ground electrode 201 and second ground electrode 202 can be composed of a transparent conductive material, such as indium tin oxide, or an opaque material. In one example, first ground electrode 201 and second ground electrode 202 each have a thickness between 10 nm and 1 mm, or larger depending on how e-paper display device 200 is to be used.

In other examples, e-paper display device 200 has a variety of other configurations. For example, each microcapsule 208 may include black particles suspended in a white colored fluid. The black particles can be positively charged particles or negatively charged particles. One or more microcapsules form a pixel of black and white images displayed on e-paper display device 200. The black and white images are created by placing black particles near or away from charge receiving layer 206. For example, the microcapsules with black particles located away from charge receiving layer 206 reflect white light, corresponding to a white portion of an image displayed on e-paper display device 200. In contrast, the microcapsules with black particles located near charge receiving layer 206 appear black to a viewer 218 corresponding to a black portion of the image displayed on e-paper display device 200. Various shades of gray can be created by using halftoning with black particles located near or away from charge receiving layer 206.

Charge receiving layer 206 may be tinted with alternating blue, red, and green regions. Adjacent blue, red, and green regions form color pixels. Color images are created by placing different combinations of white or black particles near charge receiving layer 206. For example, the microcapsules of a color pixel with white particles located near the red and green regions of charge receiving layer 206 reflect red and green light from e-paper display 200. The viewer 218 will perceive this combination as a yellow pixel. When the black particles in the microcapsules are located near charge receiving layer 206, that color pixel will appear black to the viewer 218. Additionally or alternatively, the black particles 210 of each microcapsule can be replaced by blue, red, or green positively or negatively charged particles. The particles can be used alone or in combination with a tinted charge receiving layer 206 to create a desired color image.

Ground connection 222 is electrically coupled to first ground electrode 201 to enable writing to the first portion of the e-paper display opposite to first ground electrode 201. Ground connection 224 is electrically coupled to second ground electrode 202 to enable writing to the second portion of the e-paper display opposite to second ground electrode 202. Ground connection 224 is severed, as illustrated in FIG. 7, to prevent rewriting of the second portion of the e-paper display opposite to the second ground electrode 202.

Figure 8:
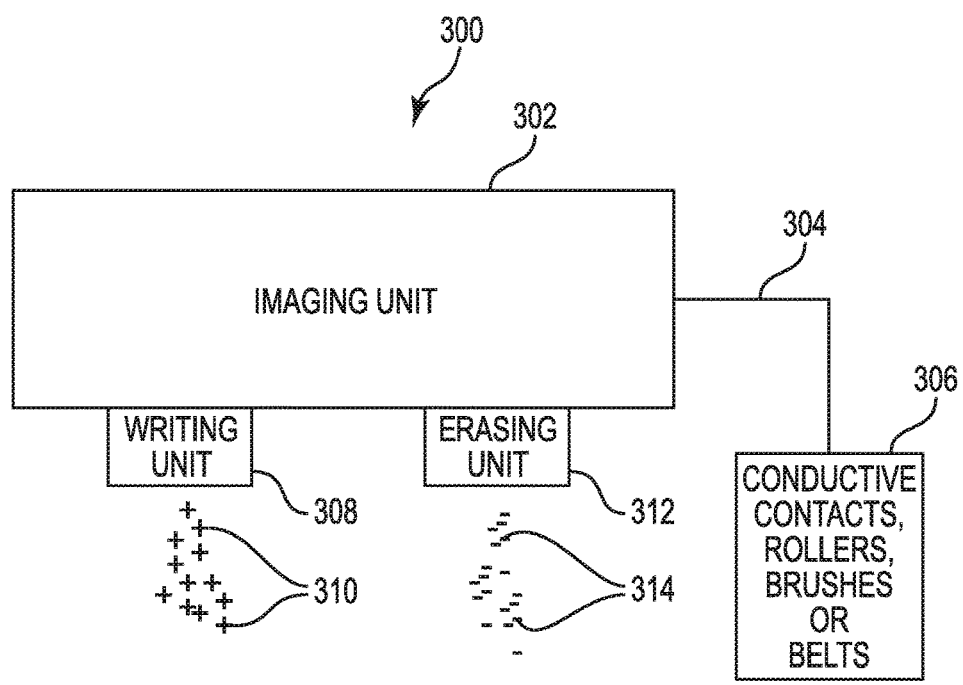
FIG. 8 illustrates one example of an imaging device.

FIG. 8 illustrates one example of an imaging device 300. In one example, imaging device 300 provides imaging device 102 previously described and illustrated with reference to FIG. 1. Imaging device 300 is used to write information to display device 120, 130, 150, 170, 180, and/or 200 previously described and illustrated with reference to FIGS. 2-7. Imaging device 300 includes an imaging unit 302 and conductive contacts, rollers, brushes, or belts 306. Conductive contacts, rollers, brushes, or belts 306 are electrically coupled to imaging unit 302 through a signal path 304. Imaging unit 302 includes a corona writing unit 308 and a corona erasing unit 312.

Corona writing unit 308 and corona erasing unit 312 are located on the same side of imaging unit 302. In one example, corona writing unit 308 and corona erasing unit 312 each include an addressable non-contact ion head. Corona erasing unit 312 selectivity ejects negative ions 314 toward an imaging surface of an e-paper display to erase any text and/or images on the e-paper display by repelling the negatively charged particles and/or by attracting the positively charged particles within the e-paper display toward the imaging surface. Corona writing unit 308 selectively ejects positive ions 310 toward an imaging surface of an e-paper display to write desired text and/or images on the e-paper display by repelling the positively charged particles and/or by attracting the negatively charged particles within the e-paper display toward the imaging surface.

Conductive contacts, rollers, brushes, or belts 306 make contact with the ground connection contact(s) of the e-paper display device during erasing and/or writing of the e-paper display to provide an electrical connection to the first ground electrode and second ground electrode (e.g., first ground electrode 201 and second ground electrode 202 previously described and illustrated with reference to FIG. 7) of the e-paper display. When using conductive rollers or belts, the rollers or belts can also set the spacing between corona writing unit 308 and corona erasing unit 312 and the e-paper display during writing of the e-paper display. The conductive rollers or belts are composed of any suitable electrically conductive material, such as a metal or conductive rubber. When using a conductive brush, the brush is composed of any suitable electrically conductive material, such as a metal or carbon.

Figure 9:
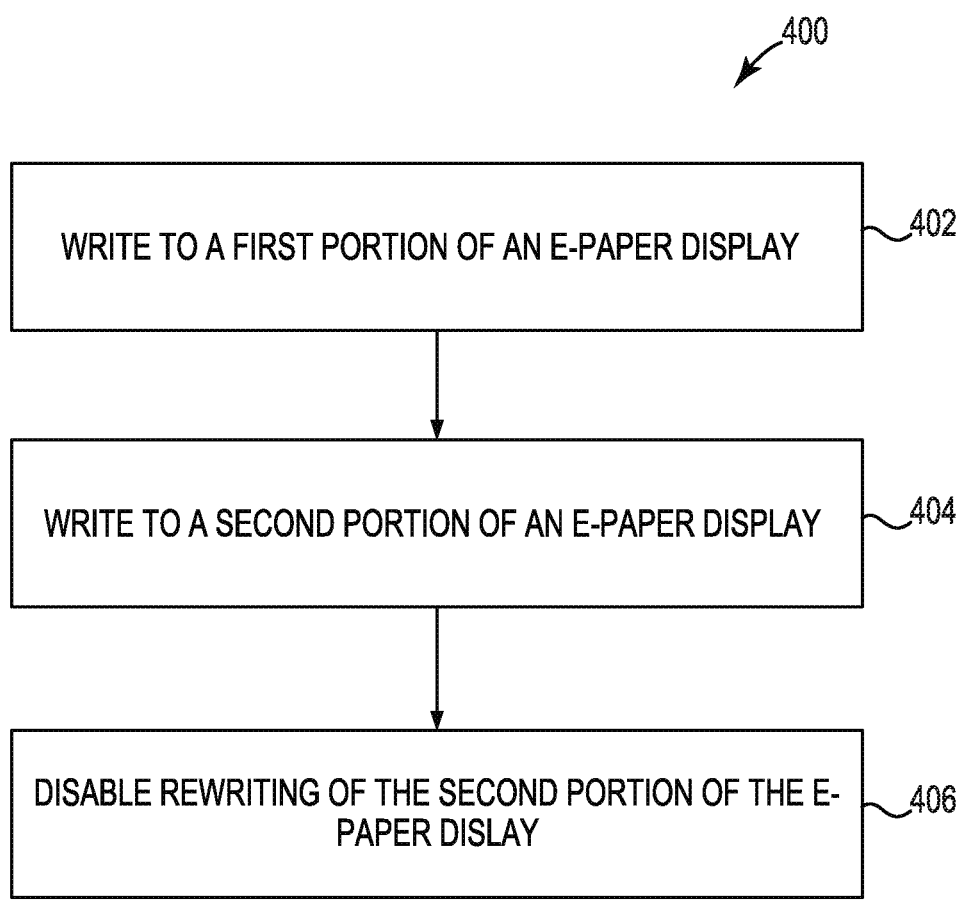
FIG. 9 is a flow diagram illustrating one example of a method for writing to a display device.

FIG. 9 is a flow diagram illustrating one example of a method 400 for writing to a display device, such as display device 120 previously described and illustrated with reference to FIG. 2. At 402, the method includes writing to a first portion of an e-paper display (e.g., first portion 124 of display device 120). At 404, the method includes writing to a second portion of an e-paper display (e.g., second portion 126 of display device 120). At 406, the method includes disabling rewriting of the second portion of the e-paper display. In one example, disabling rewriting of the second portion includes severing a ground connection to the second portion. In another example, disabling rewriting of the second portion includes electronically burning a fuse between a ground electrode of the first portion and a ground electrode of the second portion. In another example, disabling rewriting of the second portion comprises physically breaking an electrical link between a ground electrode of the first portion and a ground electrode of the second portion.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A display device comprising:
    an electronic paper display imageable by receiving charges on an imaging surface of the electronic paper display;
    a first ground electrode opposite to a first portion of the imaging surface of the electronic paper display;
    a second ground electrode opposite to a second portion of the imaging surface of the electronic paper display;
    a ground connection contact; and
    a severable electrical link between the ground connection contact and the second ground electrode,
    wherein the severable electrical link comprises a conductive material which upon exposure to radiation turns nonconductive.

2. The display device of claim 1, wherein the electronic paper display is imageable by receiving charges from a corona writing unit on the imaging surface of the electronic paper display, the electronic paper display comprising a transparent charge receiving layer providing the imaging surface.

3. The display device of claim 2, wherein the transparent charge receiving layer comprises a polymer.

4. A display device comprising:
an electronic paper display imageable by receiving charges on an imaging surface of the electronic paper display;
a first ground electrode opposite to a first portion of the imaging surface of the electronic paper display;
a second ground electrode opposite to a second portion of the imaging surface of the electronic paper display;
a ground connection contact; and
a severable electrical link between the ground connection contact and the second ground electrode,
wherein the severable electrical link comprises a charge transfer agent that when depleted turns the link nonconductive.

5. The display device of claim 4, wherein the electronic paper display is imageable by receiving charges from a corona writing unit on the imaging surface of the electronic paper display, the electronic paper display comprising a transparent charge receiving layer providing the imaging surface.

6. The display device of claim 5, wherein the transparent charge receiving layer comprises a polymer.

7. A display device comprising:
an electronic paper display imageable by receiving charges on an imaging surface of the electronic paper display, the electronic paper display comprising a first portion and a second portion;
a first ground electrode opposite to the first portion of the electronic paper display; and
a second ground electrode opposite to the second portion of the electronic paper display,
wherein writing to the second portion of the electronic paper display is selectively disableable by a pre-conductive ink over the imaging surface of the second portion which upon curing turns conductive and shorts to the second ground electrode.

8. The display device of claim 7, wherein the electronic paper display is imageable by receiving charges from a corona writing unit on the imaging surface of the electronic paper display, the electronic paper display comprising a transparent charge receiving layer providing the imaging surface.

9. The display device of claim 8, wherein the transparent charge receiving layer comprises a polymer.

10. A method for disabling rewriting of a portion of a display device, the method comprising:
writing to a first portion of an electronic paper display imageable by receiving charges on an imaging surface of the electronic paper display, the electronic paper display comprising the first portion and a second portion;
writing to the second portion of the electronic paper display; and
disabling rewriting of the second portion of the electronic paper display by exposing an electrical link comprising a conductive material to radiation to turn the conductive material nonconductive.

11. The method of claim 10, wherein writing to the second portion comprises writing a security code to the second portion.

12. The method of claim 10, wherein writing to the first portion of the electronic paper display comprises writing to the first portion of the electronic paper display by ejecting ions towards the imaging surface from a corona writing unit, the electronic paper display comprising a transparent charge receiving layer providing the imaging surface.

13. The method of claim 12, wherein the transparent charge receiving layer comprises a polymer.

14. A method for disabling rewriting of a portion of a display device, the method comprising:
writing to a first portion of an electronic paper display imageable by receiving charges on an imaging surface of the electronic paper display, the electronic paper display comprising the first portion and a second portion;
writing to the second portion of the electronic paper display; and
disabling rewriting of the second portion of the electronic paper display by depleting a charge transfer agent of an electrical link to turn the electrical link nonconductive.

15. The method of claim 14, wherein writing to the second portion comprises writing a security code to the second portion.

16. The method of claim 14, wherein writing to the first portion of the electronic paper display comprises writing to the first portion of the electronic paper display by ejecting ions towards the imaging surface from a corona writing unit, the electronic paper display comprising a transparent charge receiving layer providing the imaging surface.

17. The method of claim 16, wherein the transparent charge receiving layer comprises a polymer.

18. A method for disabling rewriting of a portion of a display device, the method comprising:
writing to a first portion of an electronic paper display imageable by receiving charges on an imaging surface of the electronic paper display, the electronic paper display comprising the first portion and a second portion, a first ground electrode opposite to the first portion, and a second ground electrode opposite to the second portion;
writing to the second portion of the electronic paper display; and
disabling rewriting of the second portion of the electronic paper display by curing a pre-conductive ink over the imaging surface of the second portion to turn the ink conductive and short the ink to the second ground electrode.

19. The method of claim 18, wherein writing to the second portion comprises writing a security code to the second portion.

20. The method of claim 18, wherein writing to the first portion of the electronic paper display comprises writing the first portion of the electronic paper display by ejecting ions towards the imaging surface from a corona writing unit, the electronic paper display comprising a transparent charge receiving layer providing the imaging surface.

* * * * *